G. RENNERFELT.
SPEED GOVERNOR FOR PRIME MOVERS.
APPLICATION FILED OCT. 10, 1908.
1,105,696.
Patented Aug. 4, 1914.
3 SHEETS—SHEET 2.
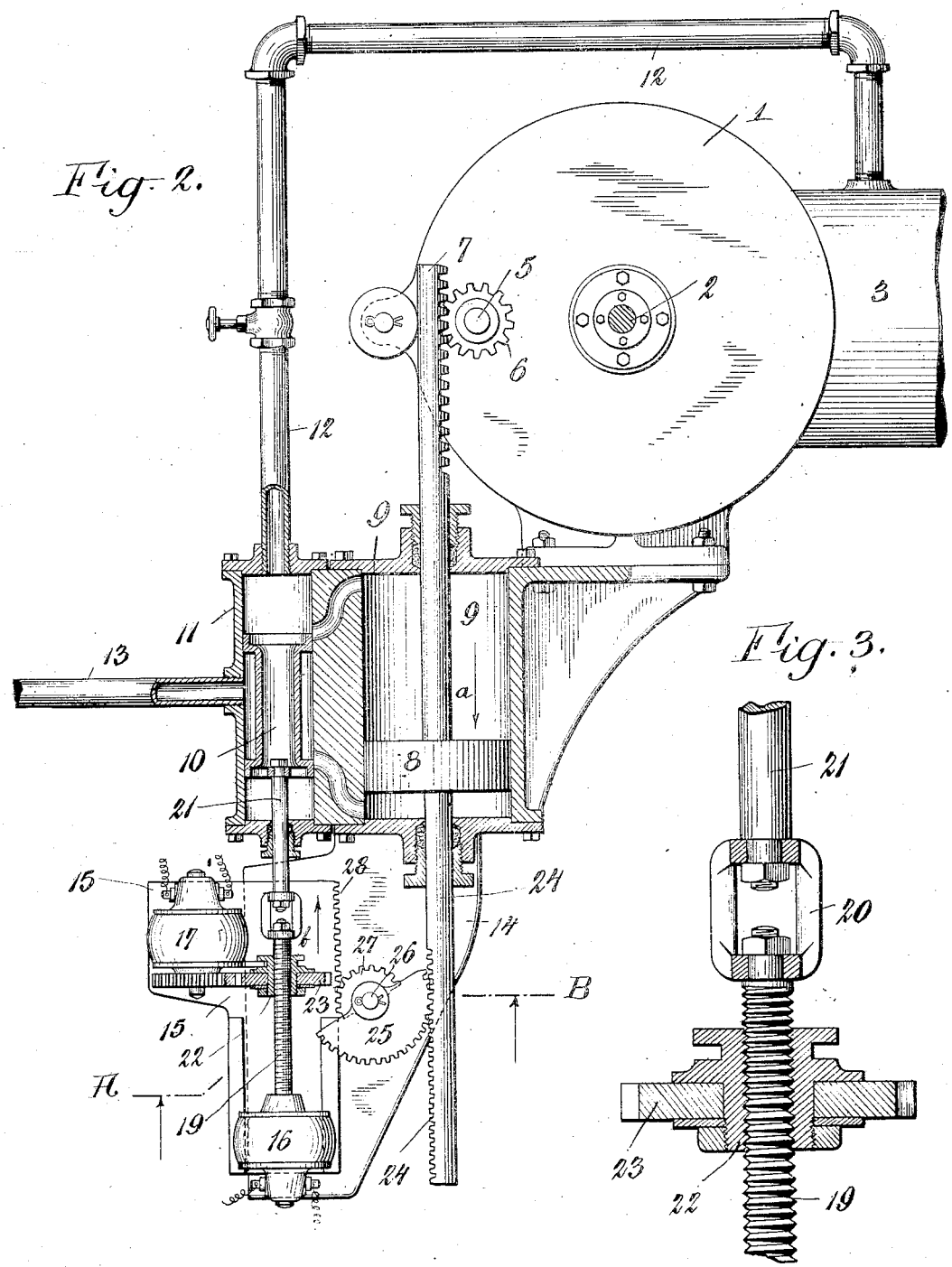
Witnesses:
M. J. Keating
H. J. Schutte
Inventor
Gustaf Rennerfelt
By Attorney
Charles J. Kintner

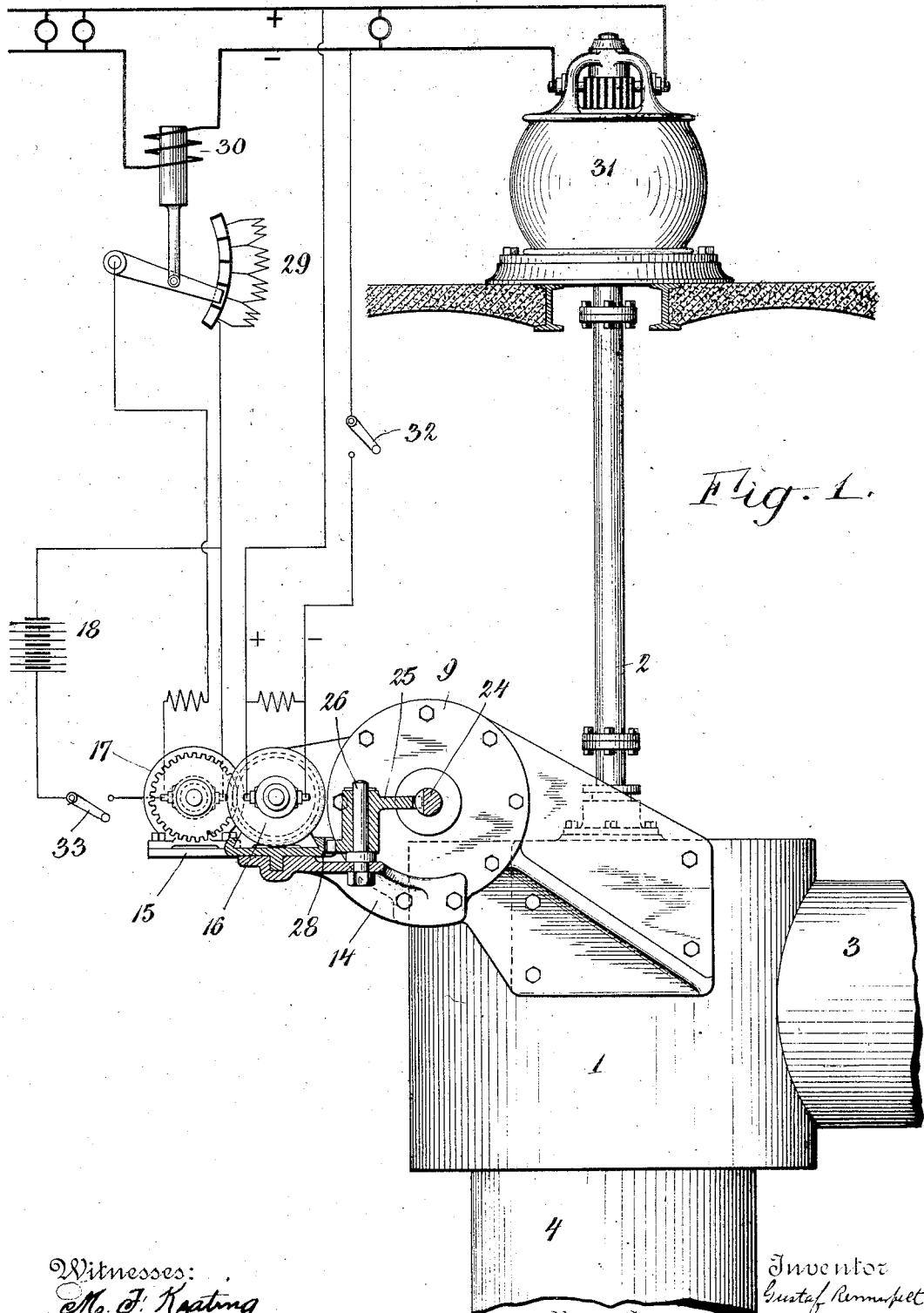

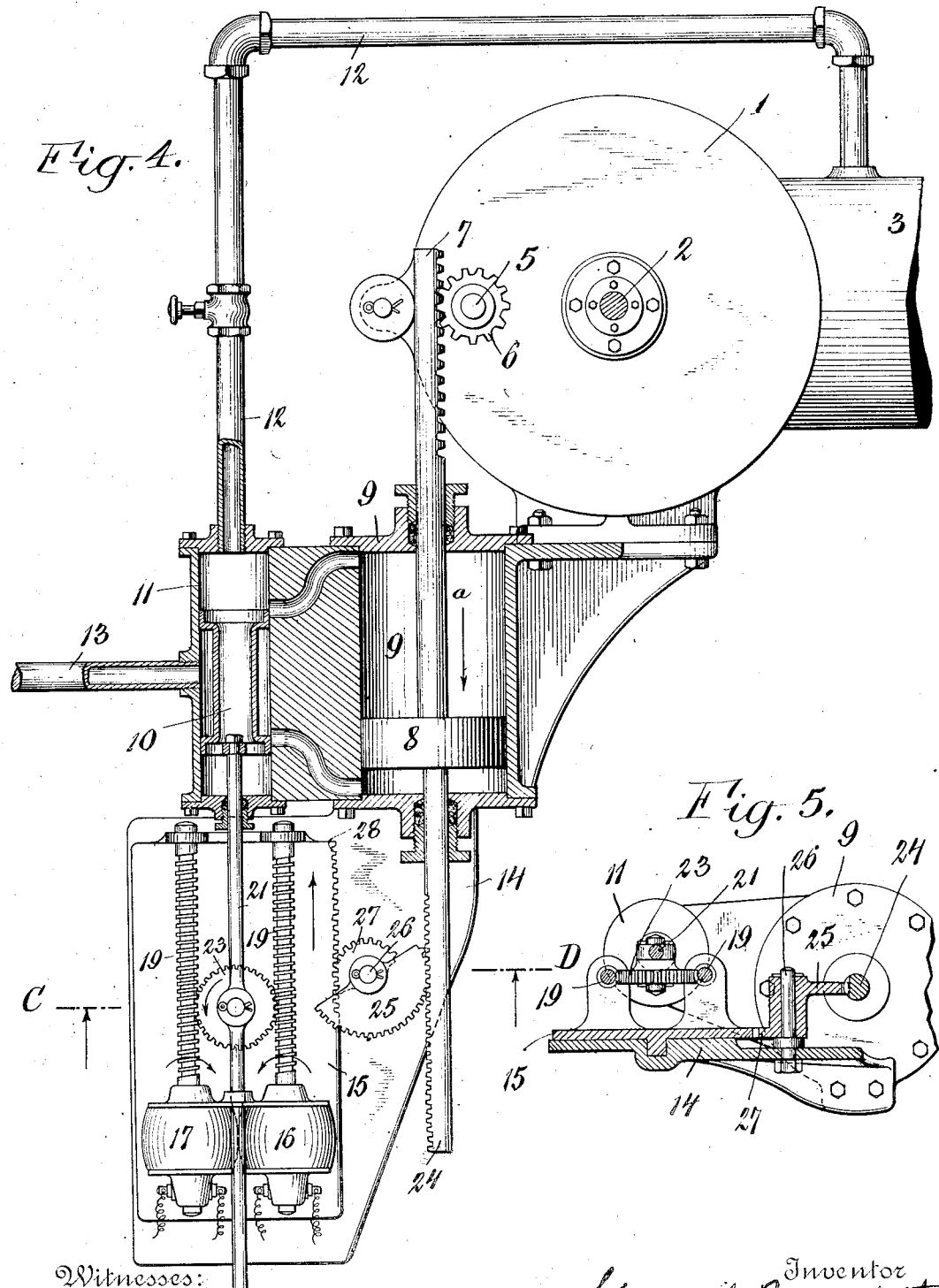

UNITED STATES PATENT OFFICE.

GUSTAF RENNERFELT, OF NEW YORK, N. Y., ASSIGNOR OF ONE-HALF TO AUGUST SUNDH, OF YONKERS, NEW YORK.

SPEED-GOVERNOR FOR PRIME MOVERS.

1,105,696.

Specification of Letters Patent.

Patented Aug. 4, 1914.

Application filed October 10, 1908. Serial No. 457,056.

*To all whom it may concern:*

Be it known that I, GUSTAF RENNERFELT, a subject of the King of Sweden, and resident of New York, borough of Manhattan, county and State of New York, have made a new and useful Invention in Speed-Governors for Prime Movers, of which the following is a specification.

My invention is directed particularly to a novel form of speed governor for use in power plants where any variation in the amount of power utilized is caused to correspondingly vary the application of power from the prime mover which supplies the same, and to this end it is directed generically to a speed governor which is essentially differential in its action; that is to say, its construction is such that the slightest variation, either in the amount of energy being used in the system or in the application of energy delivered to the prime mover by reason of the proper application of differential gear mechanism, will cause a regulation of the most delicate nature.

My invention has for its objects, first, to devise a speed governor which shall be so sensitive as to act instantaneously for any change, however small, in the speed of the prime mover or for a variation of load in the power system connected therewith, and which shall not be liable to the well known fault of "hunting," a fault common to all ball or analogous centrifugal speed governors. Second, to provide a speed governor which shall be essentially reliable in its operation, durable, and relatively cheap as to construction; easy to install, and located as near as possible to the prime mover itself, utilizing a minimum number of parts, and avoiding, as far as possible, the disturbing influence due to loose joints or play between the parts. Third, to provide a speed governor in which the essential elements thereof are governed or actuated by differential gear mechanism controlled in their operation by the joint action of the energy being utilized in the system and the applied energy which drives the prime mover itself.

Prior to my invention centrifugal speed governors of the rotary ball type have been largely used in the art, but such governors are not sufficiently sensitive to give the best possible results, because of the fact that the force exerted on the mechanism by the rotating balls is necessarily small when the variation in speed is small and such force may not be sufficient to overcome the friction in the mechanism of the governor so as to effect any regulation at all unless the variation in speed exceeds a certain limit sufficient to give the rotating balls force enough to overcome this friction. My invention is designed especially to overcome this objectionable feature and I am enabled, by the use of my improved governor, to effect a degree of regulation of the most delicate sensitiveness, and this result I accomplish by the apparatus hereinafter described.

For a full and clear understanding of my invention, such as will enable others skilled in the art to construct and use the same, reference is had to the accompanying drawings, in which, Figure 1 is a side elevational view of a prime mover of the turbine type showing various parts of my improved speed governor partly in section and as seen looking at Fig. 2 from the bottom toward the top of the drawings in the direction of the arrows, and illustrating also diagrammatically its application in connection with a system of applied energy; in this instance, an electric lighting system or plant. Fig. 2 is a plan view of Fig. 1 as seen looking from the top toward the bottom of the drawings, certain of the essential operative parts of the governor being shown in sectional view. Fig. 3 is a detail view partly in side elevation and partly in section of the controlling worm, its swivel connection with the valve stem of the controller and the screw-threaded hub and one of the pinions or gear-wheels connected therewith. Fig. 4 is a view similar to Fig. 2 of a modified form of the invention; and, Fig. 5 is a detail sectional view taken through Fig. 4 on the broken line C—D and as seen looking thereat from the bottom toward the top of the drawings.

Referring now to the drawings in detail and first to Figs. 1 to 3 inclusive, 1 represents the prime mover illustrated in the present instance as a hydraulic turbine having an inlet pipe 3 and an outlet or discharge pipe 4 and a vertically disposed rotary shaft 2, 5 being an operating shaft connected to the gate or control valve, not shown, and 6 a pinion on said shaft meshing with a rack 7 on one end of a piston rod operatively connected with the piston 8 adapted to move back and forth in a hydraulic cylinder 9, which cylinder may be bolted or rigidly secured directly to the casing of the turbine. 10 is a hollow piston valve enlarged at its opposite ends, as shown, and adapted to be moved back and forth in a cylinder 11 operatively connected with the cylinder 9 by two ports and with the inlet pipe 3 by a control pipe 12 provided with a hand control cock for regulating the flow of water therethrough. 13 is a discharge pipe for permitting of the withdrawal of the water from the cylinder 9 during the operation of the governor. 14 is a rigid bracket or shelf securely bolted to the head of the hydraulic cylinder 9. 15 is a base-plate provided with a tongue on its lower surface arranged to slide back and forth in a groove in the upper face of the rigid bracket or shelf 14. 16 is a motive device illustrated as an electric motor rigidly secured to a sliding base dove-tailed at its opposite sides and adapted to move back and forth in dove-tailed grooves in the base-plate 15. 17 is a second motive device or electric motor rigidly secured by bolts directly to the base-plate 15. These two motors 16 and 17 are preferably of small capacity and of shunt wound type, the field circuits being illustrated diagrammatically. The motor 16 is operatively connected in circuit across the current feeders of the plant which in turn are connected directly to a dynamo 31 driven by the prime mover or turbine 1; while the motor 17 is connected in circuit with a storage battery or other constant source of energy 18, and also connected through an electric regulator embracing a solenoid 30 and rheostat 29, the relations of these motors to the entire system being such that the motor 16 is adapted to run at a speed proportionate to the speed of the turbine or prime mover while the motor 17 is designed to be driven at constant speed, or at a speed increasing with the load on the dynamo 31. 32 and 33 are switches for starting and stopping these two motors. 19 is a worm or screw shown in enlarged view in Fig. 3 connected at one end to the armature of the motor 16 and at the other through a swivel joint 20 with a valve-stem 21 connected in turn to the valve 10. 22 is a nut located on the worm 19 and operatively connected through a binding nut and yielding friction washer with a gear-wheel 23, said nut being provided with a groove at one end (see Fig. 3) for receiving the end of a stationary arm secured directly to the base plate 15 (see Fig. 2), so that the nut cannot change its position when rotated with relation to such plate and, consequently, to the motor 17 carried thereby. It is the function of the binding nut and washer to afford sufficient friction between said nut and the gear-wheel 23 to enable the latter to slip, in the event of the nut being driven to either extreme end of the worm 19, sufficient friction being had, however, between said parts to transmit motion to the nut 22 through the gear-wheel 23 from a second gear-wheel on the armature shaft of the motor 17. 24 is a rack on the lower end of the piston rod which carries the piston 8, said rack being adapted to mesh with a gear segment 25 integral with a hollow shaft and a second gear segment 27 of smaller diameter, said shaft carrying these two segments being journaled upon a vertically disposed pin 26 bolted to the rigid bracket 14. 28 is a rack cut in one of the side edges of the sliding base plate 15, said rack meshing with the segment 27.

The operation is as follows: Upon the supposition that both of the switches 32 and 33 are closed and the gate of the turbine 1 is in open position water is flowing from the inlet pipe 3 therethrough and out by the outlet 4 thus driving the turbine. So long as the speed of the turbine remains constant the rotative speeds of the worm 19 and nut 22 are equal and there can be no differential variation in their relative axial positions; consequently, the piston valve 10 remains in a definite position. Suppose now that a load be added to the turbine by the placing in circuit of more electric lights, thereby requiring additional water for maintaining its speed, such load will necessarily slow down the turbine and cause the worm to rotate slower than the nut because of the fact that any decrease in the speed of the dynamo 31 will necessarily cause a diminished speed in the armature of the motor 16 which drives the worm. The worm will, therefore, move axially in the nut 22, said worm and its motor 16 sliding upon the base-plate 15, thereby shifting the valve 10 so as to admit water behind the piston 8. The piston 8 will, therefore, move and by means of the rack 7 and pinion 6 turn the gate in such direction as to admit more water to the turbine. The movement of the piston 8 in the direction of the arrow $a$ will cause a movement of the base-plate 15 in the direction of the arrow $b$ and this will cause both of the motors 16 and 17, together with the nut 22, worm 19, and valve 10 to also move in the direction of the arrow $b$, so as to again close the valve and shut off water from the cylinder 9; or, in other words, any motion of the valve due to the difference in rotative speeds of the worm and the nut will be compensated for by a motion of the valve in the opposite direction due to the movement of the plate 15, such action being in the nature of a differential effect. The valve 10 will thus be normally closed independent of the position of the piston 8 in the cylinder that is to say, this valve will be closed whether the piston is at either end of the cylinder 9 and whether the gate of the turbine is closed, open, or in any intermediate position; but this valve will be instantly opened for a small variation in the relative speed of the turbine 1 and motor 17.

If the load on the turbine is decreased its tendency is to run faster and the gate should be adjusted to admit a smaller quantity of water. This is effected by the governor in such manner that the worm 19 being rotated faster than the nut 22 will move, together with its motor 16, in a direction opposite to the one before mentioned, and shift the valve 10 so as to admit water on the opposite side of piston 8, thereby causing a partial closing of the gate, the movement of the gate causing a movement of the plate 15 so that the valve 10 is restored to normal position; that is to say, such position that it closes both of the ports in cylinder 9.

When the turbine is to be stopped the switch 33 in the circuit of motor 17 (which switch is preferably placed on the switch board) is opened. The motor 17 will then stop and the motor 16 will shift the valve 10 to such position that the gate will be fully closed so as to shut off all water from the turbine. The turbine and motor 16 will then come to a gradual stop, the nut 22 sliding in the hub of the cogwheel 23 so that no breakage will occur.

In the operation of electric power plants or stations it is sometimes important that the speed of the dynamo shall increase when its load increases so as to counteract for drop of the voltage in the line. With my improved regulator or governor I effect this automatically by raising the speed of the motor through the agency of the solenoid 30 and rheostat 29 acting so as to weaken the field of motor 17 when the load on the dynamo 31 is increased.

A number of modifications of the above described apparatus might be devised and still come within the scope of my claims. In Figs. 4 and 5 of the drawings I have illustrated one such modified form of apparatus in which two worms 19 are driven by the motors 16 and 17 mounted in a somewhat different manner from Fig. 2 and interconnected with gear-wheel 23 journaled upon the valve-stem 21, the segments 25 and 27 being supported by a journal pin 26, as before, and intergeared respectively with the racks 24 and 28, the circuit connections to the motors and system being the same as in Fig. 1, but not shown in Fig. 4. The operation of this modified form will be obvious it being apparent that for any variation in the speed of the two motors 16 and 17 there will be a corresponding differential variation in the movement of the valve-stem 21, the interrelation between the plate 15 and the piston 8 being effected in substantially the same manner as were the movements of the like parts in Fig. 2, through the aforesaid sector and rack connections.

It is also evident that the constant speed motor may drive either the nut or the worm. I prefer in most cases to use the motor 16 instead of belting and shafting for the following reasons:—Hydraulic turbines are often located in inaccessible places so that it becomes a matter of some difficulty to arrange the mechanical connection between the turbine gate and the speed governor mechanism, without introducing, under such conditions, loose joints or flexible members which tend to detract from the sensitiveness of the governor; because it is essential that a movement of the valve 10 should effect a motion of the gate and a movement of the gate should restore the valve to its normal position. Therefore, there should be no lost motion in the connections between the valve and the gate. The motor 16 constitutes a simple and reliable means of connection between the turbine or prime mover and the worm 19 and can be readily constructed and so arranged in connection therewith as to suit the conditions of different installations. Such motor can also be of small dimensions as its load is so small as to be practically negligible.

Although I have shown my invention as applicable in connection with a prime mover in the nature of a turbine and as combined with an electric power plant, obviously it may be utilized generally in the arts with all types of prime movers, such as steam engines, gas engines and the like, and when combined with all types of power plants or systems designed to practically absorb and use power, and my claims are designed to cover a speed governor of the character indicated when thus applied generally in the arts.

Having thus described my invention what I claim and desire to secure by Letters Patent of the United States is—

1. The combination of a prime mover; a source of power independent of the source of power which drives the prime mover and a motor driven by said second source of power; means for automatically increasing the speed of the motor upon an increase in the load of the prime mover, and means for maintaining the speed of the prime mover proportionate to the speed of the motor.

2. A prime mover in the nature of a power driven turbine; together with a dynamo electric machine driven thereby; a system of electrical energy supplied with current therefrom; an electro-motive device driven directly by a part of the current supplied to the system, and a second electromotive device driven by an independent source of electrical energy; in combination with means for regulating the energy which drives the prime mover and differential gear mechanism driven by the two motive devices and operatively connected to said regulating means; together with electro-magnetically controlled means operatively connected with the dynamo electric machine for regulating the electro-motive device driven by the independent source of electrical energy.

3. A prime mover, a dynamo electric machine driven thereby; a system of electrical energy supplied with current therefrom; an electro-motive device driven directly by a part of the current supplied to the system, and a second electro-motive device driven by an independent source of electrical energy; in combination with means for regulating the energy which drives the prime mover, and differential gear mechanism driven by the two motive devices and operatively connected to said regulating means; together with means controlled also by the current generated and operatively connected with the second named electro-motive device for regulating the speed thereof.

4. A hydraulic turbine having a gate for controlling the amount of water admitted to it; a hydraulic cylinder; a piston therein; connection between the gate and the piston; a valve for the cylinder; a stationary bracket; a plate arranged to slide on the bracket; a motor arranged to slide on the plate; a motor bolted to the plate, and connection between the valve and both the motors.

5. A hydraulic turbine having a gate; a hydraulic cylinder; a piston therein; a valve in the cylinder; a bracket attached to the cylinder; a plate arranged to slide on the bracket; a motor bolted to the plate; a motor arranged to slide on the plate; connection between the valve and both motors; connection between the plate and the piston, and connection between the gate and the piston.

6. A prime mover; a dynamo driven thereby; a motor whose speed depends on the voltage of the dynamo; a motor whose speed depends on the load on the dynamo, and means actuated by both the motors for adjusting the speed of the prime mover.

In testimony whereof I have signed my name to this specification in the presence of two subscribing witnesses.

GUSTAF RENNERFELT.

Witnesses:
C. J. KINTNER,
M. F. KEATING.